(12) United States Patent
Feng et al.

(10) Patent No.: US 7,345,380 B2
(45) Date of Patent: Mar. 18, 2008

(54) BACKUP POWER SUPPLY SYSTEM WITH A NULL TRANSFER TIME

(75) Inventors: Ya-Tsung Feng, Kaohsiung (TW); Chin-Chang Wu, Kaohsiung (TW); Hung-Liang Chou, Kaohsiung (TW); Nan-Ying Shen, Kaohsiung (TW); Kuo-Fang Huang, Kaohsiung (TW); Yao-Jen Chang, Kaohsiung (TW)

(73) Assignee: UIS Abler Electronics Co., Ltd., Hsintien, Taipei Hsien (TW)

( * ) Notice: Subject to any disclaimer, the term of this patent is extended or adjusted under 35 U.S.C. 154(b) by 480 days.

(21) Appl. No.: 10/878,268

(22) Filed: Jun. 29, 2004

(65) Prior Publication Data

US 2005/0088043 A1 Apr. 28, 2005

(30) Foreign Application Priority Data

Oct. 24, 2003 (TW) .............................. 92129670 A

(51) Int. Cl.
*H02J 9/00* (2006.01)
*H02J 5/00* (2006.01)

(52) U.S. Cl. ......................................... 307/80; 307/65

(58) Field of Classification Search .................. 307/65, 307/80; 363/55, 56.04, 56.06
See application file for complete search history.

(56) References Cited

U.S. PATENT DOCUMENTS 6,791,850 B2 * 9/2004 Pai et al. ...................... 363/37

* cited by examiner

*Primary Examiner*—Robert L. Deberandinis
*Assistant Examiner*—Hal I Kaplan
(74) *Attorney, Agent, or Firm*—Bacon & Thomas, PLLC

(57) ABSTRACT

A backup power supply system supplies power from a first ac power source in normal condition. Once the first ac power source is abnormal or fails, the system automatically turns off the first ac power source and turns on a second ac power source with null transfer time. When the first ac power source is normal, a dc/ac power inverter is controlled to supply an approximately null current such that a mechanical switch is allowed to be closed and no circulating current is generated between the first ac power source and the dc/ac power inverter. Since the mechanical switch is continuously closed, and requires no switching operation, the backup power supply system can supply the backup power with a null transfer time.

3 Claims, 2 Drawing Sheets

BACKUP POWER SUPPLY SYSTEM WITH A NULL TRANSFER TIME

BACKGROUND OF THE INVENTION

1. Field of the Invention

The present invention is related to a backup power supply system with a null transfer time. More particularly, the present invention is applied to a dc/ac power inverter for avoiding a short period of power interruption during the duration of the power transfer caused by the mechanical switch operation in the output terminal of the dc/ac power inverter.

2. Description of the Related Art

Referring to FIG. 1, a conventional backup power supply system (I) 10 is connected to a first ac power source 2 and a dc power source 3 at its upstream side. The conventional backup power supply system (I) 10 is further connected to a load 4 at its downstream side. The backup power supply system (I) 10 includes a first switch (S11) 101, a second switch (S12) 102 and a dc/ac power inverter 104. The dc/ac power inverter 104 converts the dc power supplied from the dc power source 3 into an ac power to build up a second ac power source 105. When the first ac power source 2 is operated normally, the first switch (S11) 101 is closed and the second switch (S12) 102 is opened. Thus, the first ac power source 2 directly supplies electric power to the load 4 and the dc/ac power inverter 104 is operated in the condition of the hot standby. When the first ac power source 2 is failed, the first switch (S11) 101 is opened and the second switch (S12) 102 is closed. In this time, the electric power demanded by the load 4 is supplied from the dc power source 3 through the backup power supply system (I) 10. Generally, the first switch (S11) 101 and the second switch (S12) 102 are static switches, such as TRIAC or a pair of SCRs (Silicon Controlled Rectifiers) parallel connected in a reverse connection. The static switch only requires a few microseconds to process the switching operation that may result in the power interruption. However, a few microseconds power interruption will not affect the normal operation of sensitive electric facilities. Hence, the backup power supply system (I) 10 can completely avoid the power interruption when power supply for the load 4 is switched from the first ac power source 2 to the second ac power source 105. However, it will result in a voltage drop on the static switch (generally 1-2 V contrast to null voltage drop of a mechanical switch) while turning on the static switch. In comparison with the mechanical switch, the static switch applied to the output side of dc/ac power inverter 104 will result in larger power loss and lower efficiency. To cool down the static switches, a heat-dissipation apparatus is required. Consequently, the backup power supply system (I) 10 has the disadvantage mentioned above although the static switch of the second switch (S12) 102 can accomplish the backup power supply system (I) 10 with a null transfer time.

Referring to FIG. 2, another conventional backup power supply system (II) 20 is connected to a first ac power source 2 and a dc power source 3 at its upstream side. The conventional backup power supply system (II) 20 is further connected to a load 4 at its downstream side. The backup power supply system (II) 20 includes a first switch (S21) 201, a second switch (S22) 202, a third switch (S23) 203 and a dc/ac power inverter 204. The dc/ac power inverter 204 converts the dc power supplied from the dc power source 3 into an ac power to build up a second ac power source 205. Wherein the first switch (S21) 201 and the second switch (S22) 202 are static switches; the third switch (S23) 203 is a mechanical switch, such as a relay or an electromagnetic contactor. When the first ac power source 2 is operated normally, the first switch (S21) 201 is closed, and the second switch (S22) 202 as well as the third switch (S23) 203 are opened. Thus, the first ac power source 2 directly supplies electric power to the load 4 and the dc/ac power inverter 204 is operated in the condition of the hot standby. When the first ac power source 2 is failed, the first switch (S21) 201 is opened, and the second switch (S22) 202 as well as the third switch (S23) 203 are closed. In this time, the electric power demanded by the load 4 is supplied from the dc power source 3 through the backup power supply system (II) 20. The first switch (S21) 201 and the second switch (S22) 202 are static switches. The static switch only requires a few microseconds to process the switching operation that may cause power interruption. However, a few microseconds power interruption will not affect the normal operation of sensitive electric facilities. Hence, the backup power supply system (II) 20 can completely avoid the power interruption when power supply for the load 4 is switched from the first ac power source 2 to the second ac power source 205. After a few microseconds, the third switch (S23) 203 with a relatively slow speed for switching has already been closed since the turn-on time of the mechanical contactor of the third switch (S23) 203 is longer than that of the second switch (S22) 202. Thus, the third switch (23) 203 acts as a bypass of the second switch (22) 202 that may avoid the voltage drop mentioned above and the power loss caused by the static switch employed in the backup power supply system 10. In comparison with the backup power supply system 10, the backup power supply system (II) 20 may increase the manufacturing cost due to the additional elements and increased dimensions. Besides, the reliability of the backup power supply system (II) 20 may be reduced due to the additional elements.

The present invention intends to provide a backup power supply system with a null transfer time by controlling the dc/ac power inverter. Whether the first power source is in a normal or abnormal condition, the output switch of the dc/ac power inverter is continuously closed. Once the first power source is abnormal or has failed, the dc/ac power inverter rapidly converts the power of the dc power source and supplies a second ac power source to a load avoiding a short period of power interruption during the power transfer duration. In this circumstance, the backup power supply system employs a mechanical switch rather than a static switch in the output side of dc/ac power inverter, and thus can improve the voltage drop of switches, increase the entire power efficiency, and prevent overheating problems etc.

SUMMARY OF THE INVENTION

The primary objective of this invention is to provide a backup power supply system with a null transfer time. The backup power supply system in this invention employs a mechanical switch connected between a dc/ac power inverter and a load, thereby solving the problems caused by the static switch in FIG. 1, and avoiding a short period of power interruption during the power transfer duration due to the operation of the mechanical switch in FIG. 2. The mechanical switch is continuously closed between the dc/ac power inverter and the load when a first ac power source is normal. The dc/ac power inverter supplies an approximately null current to thereby avoid a circulating current between the first ac power source and the dc/ac power inverter. When the first ac power source is abnormal or failed, the dc/ac power inverter rapidly builds up a sine-wave voltage as well as a second ac power source to supply to the load. Since the mechanical switch connected between the dc/ac power inverter and the load is continuously closed and no transfer time is required, the backup power supply system can supply the backup power with a null transfer time. The mechanical switch may be opened to switch off the dc/ac power inverter when the dc/ac power inverter fails.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 3:
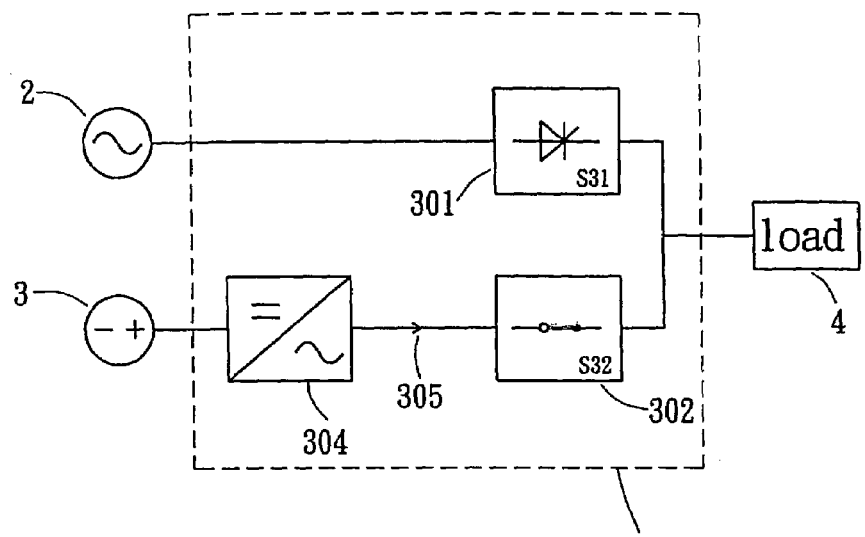
FIG. 3 is a schematic circuitry of a backup power supply system with a null transfer time in accordance with a preferred embodiment of the present invention.

Referring initially to FIG. 3, it illustrates a schematic circuitry of a backup power supply system in accordance with the preferred embodiment of the present invention.

Referring to FIG. 3, the backup power supply system 30 with a null transfer time is connected to a first ac power source 2 and a dc power source 3 at its upstream side. The backup power supply system 30 is further connected to a load 4 at its downstream side. The backup power supply system 30 includes a first switch 301, a second switch 302 and a dc/ac power inverter 304.

Referring again to FIG. 3, the dc/ac power inverter 304 converts the dc power supplied from the dc power source 3 into an ac power to build up a second ac power source 305. Wherein the first switch 301 is a static switch, while the second switch 302 is a mechanical switch. When the first ac power source 2 is normal, the first switch 301 and the second switch 302 are closed. Furthermore, the dc/ac power inverter 304 supplies an approximately null current to thereby avoid a circulating current between the first ac power source 2 and the dc/ac power inverter 304. Thus, the first ac power source 2 directly supplies electric power to the load 4. When the first ac power source 2 fails, the first switch 301 is opened and the second switch 302 has been closed continuously so that no switching operation is required. The dc/ac power inverter 304 rapidly builds up a sine-wave voltage as well as a second ac power source 305 to supply to the load 4. Consequently, the backup power supply system 30 can completely avoid the power interruption when the power supply to the load 4 is transferred from the first ac power source 2 to the second ac power source 305.

Figure 1:
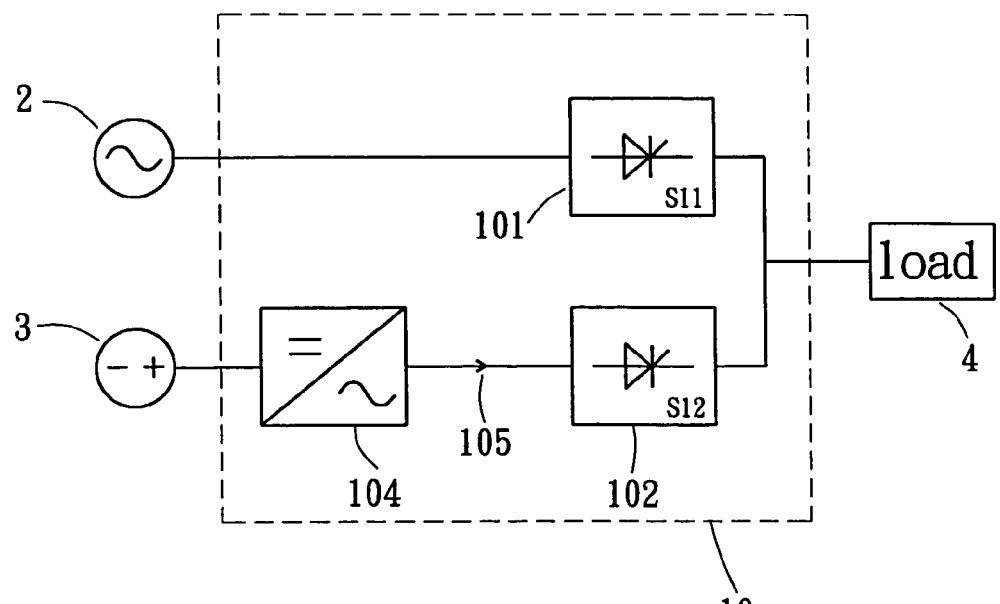
FIG. 1 is a schematic circuitry of a conventional backup power supply system (I) in accordance with the prior art.
Figure 2:
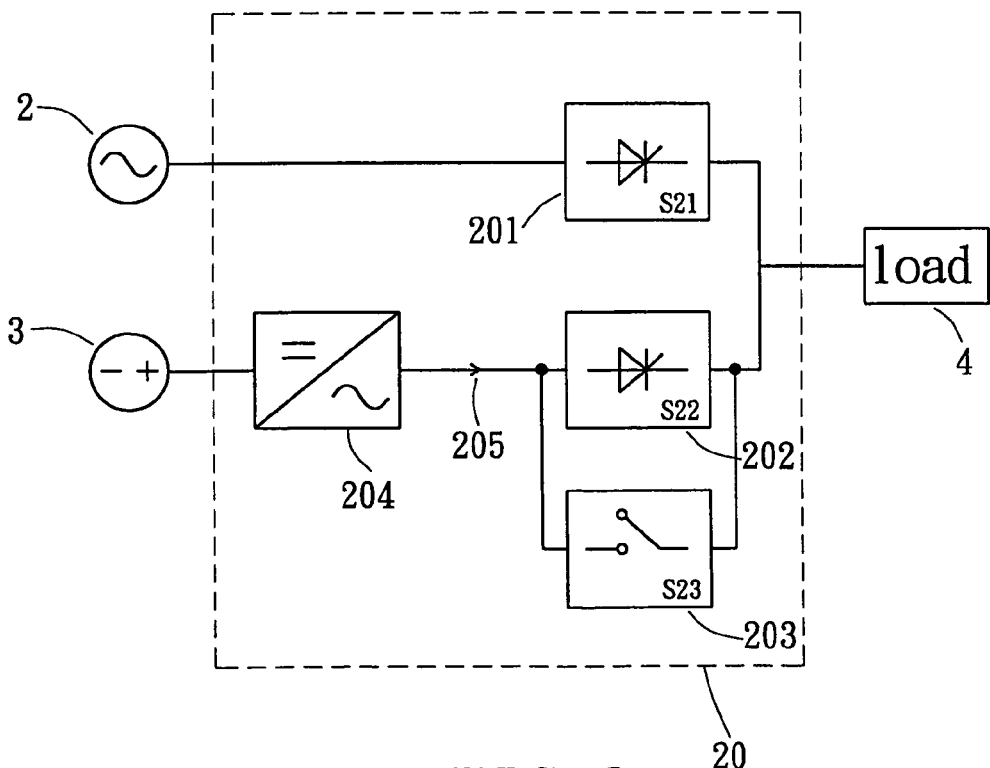
FIG. 2 is a schematic circuitry of another conventional backup power supply system (II) in accordance with the prior art.

Referring back to FIGS. 1 and 3, the backup power supply system 30 in accordance with the present invention eliminates the drawbacks of the voltage drop on the static switch, improves the entire power efficiency and prevents overheating problems caused by the conventional backup power supply system 10.

Referring back to FIGS. 1 and 3, the backup power supply system 30 in accordance with the present invention eliminates the drawbacks of increased manufacturing cost caused by the additional elements and dimension problem caused by the conventional backup power supply system 20.

Generally, the backup power supply system 30 of the present invention is applied to the off-line type UPS and the on-line type UPS with an economical operation mode requiring uninterrupted power transfer. Under the normal operation of the on-line type UPS, the power of the load is supplied from the dc/ac power inverter regardless of whether the first ac power source 2 is normal or not. The on-line type UPS can be operated in the power-save operation mode in order to obtain a higher power efficiency. The power-save operation mode is so called because the dc/ac power inverter is operated in a hot standby state. Meanwhile, the utility current supplied by the ac first power source 2 shown in FIG. 3, supplies ac power to the load and charges the battery set provided in the dc power source 3 in FIG. 3. Once the utility fails, a transfer switch actuates the dc/ac power inverter to supply power to the load continuously. Hence, the switching characteristic of the transfer switch for the dc/ac power inverter may affect the transfer time and the efficiency of the on-line type UPS with power-save economical operation mode. To obtain a better transfer performance and higher power efficiency, the backup power supply system 30 with a null transfer time in accordance with the present invention is specifically suitable for the on-line type UPS under the power-save operation mode.

Figure 4:
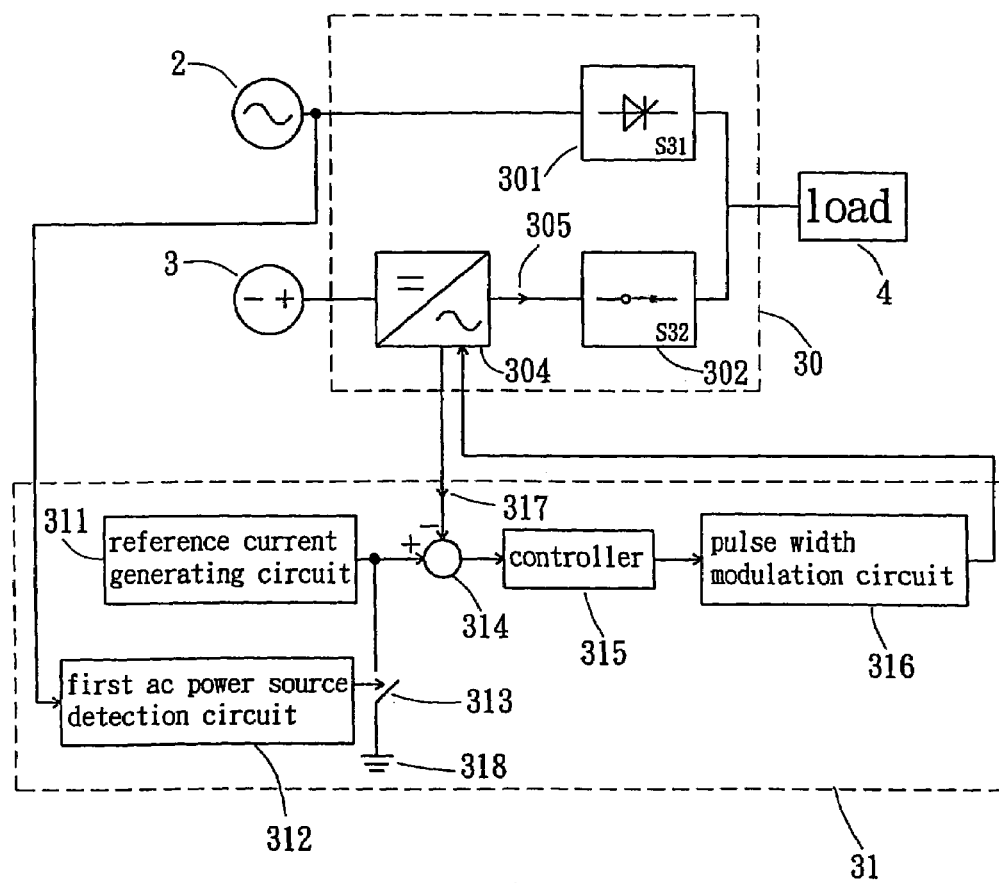
FIG. 4 is a block diagram of the backup power supply system and controlling a dc/ac power inverter thereof in accordance with the preferred embodiment of the present invention.

FIG. 4 illustrates a block diagram of the backup power supply system and controlling a dc/ac power inverter thereof in accordance with the preferred embodiment of the present invention.

Referring to FIG. 4, the dc/ac power inverter 304 adopts a current-mode control. The backup power supply system 30 employs a control block 31 for controlling the dc/ac power inverter 304. The control block 31 includes a reference current generating circuit 311, a first ac power source detection circuit 312, a switch 313, a subtractor 314, a controller 315 and a pulse width modulation circuit 316.

Referring again to FIG. 4, the control block 31 employs the reference current generating circuit 311 for generating a reference current signal. The dc/ac power inverter 304 sends its output current to the control block 31 as a feedback signal 317. The reference current signal and the feedback signal 317 are used to control the dc/ac power inverter 304 to supply a sine wave voltage. The first ac power source detection circuit 312 is connected to the first ac power source 2 for detecting the condition of the first ac power source 2. The detected result of the first ac power source detection circuit 312 is sent to the switch 313 for turning on or off the switch 313, so as to determine whether the reference current generating circuit 311 is connected to a ground line 318 or not. The output signal of the subtractor 314 is used to actuate the dc/ac power inverter 304 via the controller 315 and the pulse width modulation circuit 316 so that the current mode control is accomplished.

Referring again to FIG. 4, when the first ac power source 2 is operated normally, the first ac power source detection circuit 312 sends a signal to turn on the switch 313. Subsequently, the output of the reference current generating circuit 311 is connected to the ground line 318 so that the reference current signal is approximated to a zero voltage. This zero reference current signal and the feedback signal 317 are calculated in the subtractor 314 and the controller 315. The output signal of the controller 315 is sent to the pulse width modulation circuit 316 to generate the drive signals for the dc/ac power inverter 304. Since the reference current signal is approximated to a zero voltage, the output current of the dc/ac power inverter 304 is approximately a null current after the closed loop control with this zero reference current signal. At this time, although the first switch 301 and the second switch 302 are closed, however, no circulating current is generated between the first power source 2 and the dc/ac power inverter 304. Besides, no additional power loss occurs in the dc/ac power inverter 304 due to the null output current of the dc/ac power inverter 304. Consequently, the first ac power source 2 can supply the power to the load 4.

Referring again to FIG. 4, when the first ac power source 2 is failed, the first switch 301 is rapidly opened to switch the first ac power source away from the load. Meanwhile, the first ac power source detection circuit 312 sends a signal to turn off the switch 313. The signal of the reference current generating circuit 311 sent to the subtractor 314 is disconnected from the ground line 318 so that the reference current signal is not equal to a zero voltage. The reference current signal and the feedback signal 317 are calculated in the subtractor 314 and the controller 315. The output signal of the controller 315 is sent to the pulse width modulation circuit 316 to generate the drive signals for the power electronic devices of the dc/ac power inverter 304. Subsequently, the output current of the dc/ac power inverter 304 generates a sine wave voltage after the closed loop control with this on-zero reference current signal. Because the second switch 302 is closed, the second ac power source 305 immediately supplies power to the lead 4 via the dc/ac power inverter 304. However, when the first ac power source 2 fails or is abnormal, no switch operation of the switch 302 is required due to the fact that the second switch 302 has been turned on while the first ac power source 2 is normal. Consequently, the short period of power interruption caused by the mechanical switching operation of the second switch 302 can be avoided.

Referring again to FIG. 4, the reference current generating circuit 311, the first ac power source detection circuit 312, the subtractor 314, the controller 315 and the pulse width modulation circuit 316 are employed in a control block 31 of the backup power supply system 30. The control block 31 for the backup power supply system 30 only requires employing the switch 313 to connect the first ac power source detection circuit 312 such that the function of the null transfer time for the backup power supply system 30 is carried out.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A backup power supply system with a null transfer time, comprising:
 a first static switch connected between a first ac power source and a load;
 a second mechanical switch; and
 a dc/ac power inverter including a dc terminal connected to a dc power source at its upstream side for converting the dc power source into a second ac power source, and an ac terminal connected to the second switch so that the second switch is connected between the dc/ac power inverter and the load;
 wherein when the first power source is normal, the first switch and the second switch are closed, and the dc/ac power inverter is controlled to supply an approximately null current; and
 wherein when the first ac power source is abnormal or fails, the first switch is opened and the second switch is continuously closed so that the dc/ac power inverter rapidly supplies a sine wave voltage to the load; whereby the second switch does not require switching operation at the instant when the first ac power source is abnormal or fails.

2. The backup power supply system with a null transfer time as defined in claim 1, wherein the dc/ac power inverter is operated via current-mode control; a feedback signal from the dc/ac power inverter and a reference current signal being controlled via closed loop control so that the dc/ac power inverter generates a current approximately equal to the reference current.

3. The backup power supply system with a null transfer time as defined in claim 2, wherein the reference current is generated from a reference current generating circuit whose output is connected to a ground line via a switch; when the first ac power source is normal, the reference current generating circuit is connected to the ground line so that no current is output from the dc/ac power inverter; and when the first ac power source is abnormal or fails, the reference current generating circuit is disconnected from the ground line and the dc/ac power inverter controlled by the closed loop control can generate the sine wave voltage.

* * * * *

UNITED STATES PATENT AND TRADEMARK OFFICE
CERTIFICATE OF CORRECTION

PATENT NO.        : 7,345,380 B2 Page 1 of 1
APPLICATION NO.   : 10/878268
DATED             : March 18, 2008
INVENTOR(S)       : Ya-Tsung Feng et al.

It is certified that error appears in the above-identified patent and that said Letters Patent is hereby corrected as shown below:

Title page, item [73] Assignee, change "UIS Abler Electronics Co., Ltd." to -- Ablerex Electronics Co., Ltd. --.

Signed and Sealed this

Fifteenth Day of December, 2009

David J. Kappos
*Director of the United States Patent and Trademark Office*